Dec. 2, 1958 W. JACKSON, JR 2,863,115
POLAROGRAPHIC APPARATUS AND METHOD
Filed Oct. 3, 1955
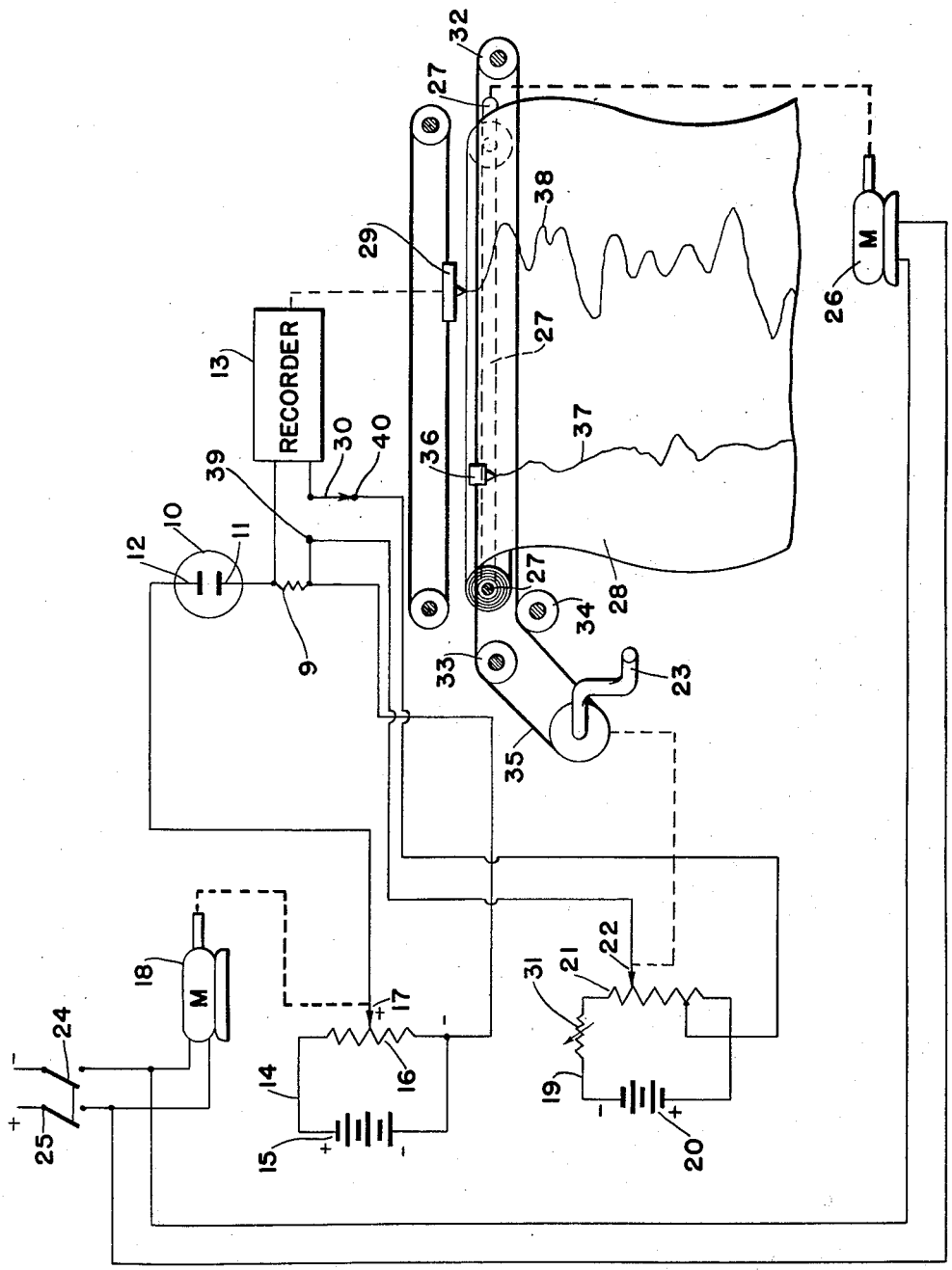
INVENTOR.
WARREN JACKSON, JR.
BY
*Leland L Chapman*
ATTORNEY

United States Patent Office 2,863,115
Patented Dec. 2, 1958

2,863,115

POLAROGRAPHIC APPARATUS AND METHOD

Warren Jackson, Jr., Lyndhurst, Ohio, assignor to The Standard Oil Company, Cleveland, Ohio, a corporation of Ohio Application October 3, 1955, Serial No. 538,081

3 Claims. (Cl. 324—30)

The present invention relates to an improved apparatus and method for the study of electrochemical phenomena.

It has been known for some time that every electrolytic decomposition takes place at a definite voltage, termed the decomposition potential which is characteristic of the particular substance being decomposed. Ideally, if a voltage less than the decomposition potential of a substance is applied between electrodes immersed in a solution of that substance no decomposition takes place, and substantially no current flows. On the other hand, if a voltage at least equal to the decomposition potential is applied, electrolysis occurs and the strength of the electrolizing current is proportional to the concentration of the substance in the solution.

It follows, therefore, that when a gradually increased voltage is applied between electrodes immersed in a solution of several substances, no appreciable current will pass until the lowest decomposition potential is reached. When this value is attained a current proportional to the concentration of the respective substance flows. This current is known as the diffusion current. When the next higher decomposition potential is reached, a sudden increase in current occurs proportional to the concentration of this second substance, and so on. The determination of such a current-voltage curve for a given solution thus amounts to a qualitative and quantitative analysis of that solution. The curve obtained in this manner is known as a polarogram. The apparatus employed in obtaining such a curve is known as a polarograph.

In the usual polarograph, a reference electrode of known potential and an indicating electrode are immersed in a vessel containing the solution to be analyzed. A slowly increasing potential is applied between the electrodes by means of a slide-wire potentiometer arranged so that the slide is drawn at a uniform rate by a small motor. The variations in current caused by the increasing voltage and the voltage itself may be determined and recorded by means such as a movable stylus responsive to the current and a strip of paper wound on a drum which is rotating at a speed directly proportional to the speed at which the slide is drawn on the aforesaid slide-wire potentiometer.

Customarily, in order to obtain a true polarographic analysis of a solution, it is first necessary to obtain a polarographic analysis of the solvent in the absence of the substances to be analyzed. This is so because the solvent itself will often decompose to some extent during a polarographic analysis and will contribute extraneous values of current to the diffusion current resulting from the decomposition of the substances for which analysis is sought. This phenomenon renders the determination of the amount and kind of the various substances in the solution exceedingly difficult. However, if the solvent is first analyzed polarographically in the absence of added substances, it is possible to obtain a true polarogram of the substances which may be dissolved in that solvent. This in an analytical technique which has been employed by the art for a number of years. The techniques employed heretofore have all involved separate polarographic determinations on the solvent alone and on the solvent containing the substances to be analyzed, followed by a mathematical comparison of the two determinations whereby a true polarogram is obtained. This technique has proved to be somewhat tedious and is, of course, always subject to errors in the mathematical comparison.

It is the object of the present invention to provide a polarographic apparatus by means of which a true polarogram for a solution may be obtained without resort to a mathematical computation.

Another object of the present invention is to provide a method by means of which a true polarogram for a solution may be obtained without resort to a mathematical computation.

These and other objects are attained in the determination of polarographic data, for example, by first determining on a chart a polarogram for the solvent which is employed in the solution to be analyzed. The chart is then turned back to its starting position and the recording of the curve of the solution for which the analysis is sought is begun. Simultaneously, the polarogram obtained on the solvent alone is traced with a manually operated pointer. The movements of the pointer produce corresponding variations in the magnitude of the voltage developed by a potentiometer device. The potentiometer slider is adjusted so that the voltage out-put therefrom is proportional to the current resulting from the polarographic analysis of the blank solvent at a corresponding time. This voltage is impressed upon the recording means of the type usually employed in a polarographic test circuit so that the curve traced by the recording means corresponds directly to the substance contained in the solution being analyzed and is not affected by the polarographic current values resulting from the decomposition of the solvent in which the substances are dissolved.

In brief, the present invention comprises a conventional polarographic apparatus having an additional electrical energy source means electrically coupled with the usual recording means of such an apparatus. The electric impulses generated by the additional electric energy source means correspond to predetermined values of current and are impressed upon the recording means of the conventional polarographic circuit. Thus, an apparatus is provided for polarographic analyses which will compensate for the effect of the decomposition of the solvent on the polarographic analysis of a solution so that a true polarogram of the substances contained in the solution will be obtained.

The invention will be better understood by reference to the attached drawing wherein the polarographic electrical circuit of this invention is shown as well as a pictorial representation of a polarogram and the line follower mechanism of this invention.

Referring now to the attached patent drawing, there is shown the polarographic test cell 10 having an indicating electrode 11 and a reference electrode 12. Test cell 10 is connected in a loop circuit with a resistance 9 and an electric energy source means 14, the several elements of the loop circuit being serially coupled around the circuit. The value of the resistance 9 is negligible in comparison to the other resistance values in the loop circuit. A second electrical energy source means 19 may be electrically coupled to the recorder 13 by means of the single pole-double throw switch 30. This circuit forms the polarographic apparatus of this invention.

The first electrical energy source means 14 takes the form of a D. C. energy source 15 (shown as a battery) which develops a constant D. C. potential across the potentiometer 16. The potentiometer 16 has a variable tap 17 which is driven by a suitably linked electric motor 18. A variable tap 17 is connected in the circuit so that at least a fraction of the voltage VE (exciting voltage) appearing between the tap 17 and the lower end of the potentiometer is applied across the test cell. A second electrical energy source means 19 takes the form of a D. C. energy source 20 (shown as a battery) which develops a constant D. C. potential across a potentiometer 21. A variable resistance 31 may be used to vary the voltage impressed upon the potentiometer 21. Potentiometer 21 has a variable tap 22 which is mechanically linked to a hand crank 23.

The recorder 13 contains conventional current sensing means such as a micro-voltmeter (not shown) which through conventional amplification means (not shown) actuates a plotting stylus 29. The micro-voltmeter measures the voltage drop across the resistance 9 and accordingly is sensitive to changes in the current flowing through test cell 10. The plotting stylus 29 will trace a curve on the record strip 28 which is wound on the shaft 27 and rotated by means of the motor 26. The stylus 29 is arranged so as to indicate horizontal displacement in direct proportion to the amount of current passing through test cell 10 as indicated by the recorder means 13 which measures the voltage drop across the resistance 9. Adjacent to the record strip, a pointer 36 is mounted which is adapted to follow a curve on the record strip 28. Pointer 36 is attached to an endless belt 35 which moves about the pulleys 32, 33 and 34 and is responsive. The pointer 36 is directly responsive to movements of the crank handle 23. The crank handle 23 is mechanically linked by suitable means to the variable tap of the potentiometer 21.

The potentiometer 21 is thrown in or out of the recording circuit by means of the switch 30. When the potentiometer 21 is in the recording circuit, the voltage applied between the variable tap 22 and the lower end of the potentiometer 21 is applied to the recorder 13 at the terminals 39 and 40. This has the substantial effect of reducing or, in some instances, adding to the voltage which is measured by the recorder means 13.

To initiate a polarographic analysis by means of this apparatus, the switch 30 is connected to the terminal 39 so that the second electrical energy source means 19 is disconnected from the recorder means 13. The solvent which is to be employed in the solution to be analyzed is placed in the test cell 10 in the absence of added substances. The motor 18 is energized by throwing a double pole-single throw switch 24 to connect the motor through terminal 25 to an electric energy source (not shown). When energized, motor 18 drives a gear box (not shown) which in turn moves variable tap 17. Preferably, the potentiometer 16 is so constructed that as tap 17 moves, the exciting voltage starts at zero value and increases in a manner which is linear with time. It is within the scope of this invention to have the exciting voltage change either positively or negatively from its initial value provided there is a change in the absolute magnitude of the exciting voltage over the course of the analysis.

Closing of the switch 24 also energizes electrical motor 26 which is suitably linked to the shaft 27 upon which record strip 28 is rolled. Record strip 28 accordingly moves vertically through a plotting area so as to contact the plotting stylus 29. Plotting stylus 29 is actuated by the recorder 13 as explained heretofore and a curve 37 is traced which is a polarogram representative of the polarographic values of the solvent. The system is now de-energized and the record strip 28 is rolled backwards manually until the stylus 29 reaches a point corresponding to the starting point of the curve 37. The potentiometer 21 is then calibrated in the conventional manner by means of the variable resistance 31 so a voltage corresponding to values of the curve 37 will be produced by the potentiometer 21 as the pointer 36 is moved by the crank 23 to follow curve 37.

A switch 30 is then connected to the terminal 40 so that the electrical energy source means 20 is electrically coupled with the recording means 13. The test cell 10 is emptied of the solvent and is replaced with the solution to be analyzed. When this has been accomplished, the switch 24 is once again connected to the terminals 25 so as to re-energize the system. The stylus 29 will now trace a new curve 38. However, while the curve 38 is being traced, the pointer 36 is manually adjusted by means of the crank handle 23 so that it exactly follows the previously traced curve 37. Movements of the crank handle 23, in order to follow the curve 37 with the pointer 36, will cause proportional changes in the voltage impressed upon the recording means 13 by moving the variable tap 22 of the potentiometer 21. The voltage developed by the potentiometer 21 will correspond to the voltage measured by the recording means during the analysis of the solvent alone and will compensate for that voltage. This has the substantial effect of subtracting or, in some instances, adding a voltage corresponding to the values recorded during the polarographic analysis of the solvent alone to the values obtained during the polarographic analysis of the solution. The polarographic curve 37 which is traced by the stylus 29 is therefore representative of the true polarographic values of the substances contained in the solution.

Thus, there has been provided an apparatus and method by which it is possible to instantaneously determine a true polarogram for substances contained in a solution without resort to mathematical computation.

It will be obvious to those skilled in the art that modifications of the embodiment of this invention which has been described above may be accomplished. However, this application for Letters Patent is intended to cover all such modifications as would reasonably fall within the scope of the appended claims.

I claim:

1. A polarographic apparatus comprising means for containing a solution to be analyzed, a pair of electrodes adapted to contact said solution, first electrical energy source means electrically connected to said electrodes so as to impress a substantially linear voltage sweep across said electrodes giving rise to a varying flow of current therebetween, current sensing means electrically connected with said electrodes so as to sense the flow of current therebetween, recording means connected with said sensing means to record the current values measured by said sensing means comprising a movable chart and stylus, second electrical energy source means removably connected in electrical circuit with said recording means, indicator means adapted to follow in one direction a pre-traced curve on said movable chart as said chart moves in another direction, means linking said indicator means with said second electrical energy source means so as to vary the voltage impressed on said recording means by said second energy source means in accordance with the movements of said indicator means.

2. A polarographic apparatus comprising means for containing a solution to be analyzed, a pair of electrodes adapted to contact said solution, first electrical energy source means electrically connected to said electrodes so as to impress a substantially linear voltage sweep across said electrodes giving rise to a varying flow of current therebetween, current sensing means electrically connected with said electrodes so as to measure the current flowing therebetween, recording means connected with said sensing means so as to record the values of current measured by said sensing means comprising a movable chart and stylus, second electrical energy source means removably connected in electrical circuit with said recording means, indicator means movably mounted so as to follow a pre-traced curve on said chart, means linking said indicator means to said second electrical energy source means to change the voltage output of said second energy source means in correspondence with the movements of said indicator means.

3. A polarographic apparatus comprising means for containing a solution to be analyzed, a pair of electrodes adapted to contact said solution, first electrical energy source means electrically connected to said electrodes to impress a substantially linear voltage sweep across said electrodes giving rise to a varying flow of current therebetween, current sensing means electrically connected with said electrodes to measure the current flowing therebetween, recording means electrically connected to said current sensing means and adapted to record the values of current measured by said sensing means comprising a movable chart and stylus, second electrical energy source means removably connected in electrical circuit with said recording means, indicator means movably mounted on pulley means in juxtaposition to said chart to permit said indicator means to follow a pre-traced curve on said chart in one direction while said chart moves in another direction, means linking said indicator means to said second energy source means to vary the voltage developed by said second energy source means in correspondence with the movements of said indicator means, and means for moving said indicator means.

References Cited in the file of this patent

UNITED STATES PATENTS

| | | |
|---|---|---|
| 2,212,799 | Sperry | Aug. 17, 1940 |
| 2,674,719 | Williams | Apr. 6, 1954 |